Patented Feb. 23, 1937

2,072,062

UNITED STATES PATENT OFFICE 2,072,062

PROCESS OF DYEING CELLULOSE, COTTON, OR THE LIKE

Arthur Wolfram and Kurt Bonstedt, Frankfort-on-the-Main, Germany, assignors to General Aniline Works, Inc., New York, N. Y., a corporation of Delaware No Drawing. Application February 6, 1935, Serial No. 5,302. In Germany February 10, 1934

4 Claims. (Cl. 8—5)

Our present invention relates to a process of dyeing cellulose, cotton or the like.

We have found that sulfonic acids of fluorindines are generally dyestuffs of a substantive character. To this group of dyestuffs there belong, on the one hand, the fluorindine-sulfonic-acids which are already known from the literature (cf., for instance, German Patent 78,601) and, on the other hand, those dyestuffs which are obtainable according to the process described in our copending application Serial No. 739,326, filed August 10, 1934. Thus, for instance, the alkali salts of the sulfonic acids of diarylfluorindines, obtainable by the process of our said co-pending application, of the probable general formula:

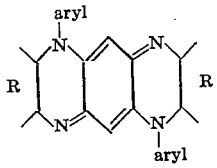

which contain negative groups as, for instance, the nitro-, CO-alkyl-, CO-aryl-, carboxyl- or the quinone group or polynuclear ring-systems, such as the ring system of naphthalene, diphenyl, stilbene, pyrene, anthracene, or both, and which may be halogenated, the R's standing for aryl radicals which may be the same as or different from those otherwise present, dye directly cellulose, for instance, cotton, regenerated cellulose and the like. Thus, there has been found a new group of dyestuffs which dye the fiber directly.

The dyestuffs may be obtained according to the process of our co-pending application above referred to, for instance, by oxidizing to the fluorindine compound, according to known methods an azophenin compound of the general formula:

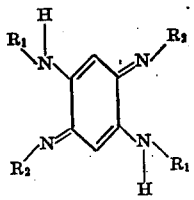

wherein $R_1$ represents an aromatic radical containing a negative substituent of the group consisting of nitro, CO-alkyl, CO-aryl and carboxyl, or containing more than one aromatic nucleus or a quinone nucleus and wherein $R_2$ represents an aromatic hydrocarbon radical, and sulfonating the product thus obtained.

The following examples illustrate the invention; the parts are by weight:

(1) A melt of 10 parts of para-amino-diphenyl is stirred at 90° C. with 1 part of the hydrochloride of para-amino-diphenyl, and 1 part of para-nitroso-phenol is added in small portions, so that the temperature remains as constant as possible. After one hour the whole is allowed to cool to about 70° C. and 10 parts of alcohol are then added. The precipitated crystals are filtered with suction and thoroughly washed with water in order to remove the hydrochloride. The reaction product thus obtained forms red-brown crystals which dissolve in concentrated sulfuric acid to a blue solution.

One part of the product obtained is dissolved in 30 parts of nitrobenzene and the solution is heated at boiling temperature for half-an-hour with 0.7 part of lead dioxide. The blue-violet solution is filtered while hot. On cooling, the fluorindine separates in the form of dark-colored crystals which dissolve in concentrated sulfuric acid to a blue solution. The fluorindine has the following probable formula:

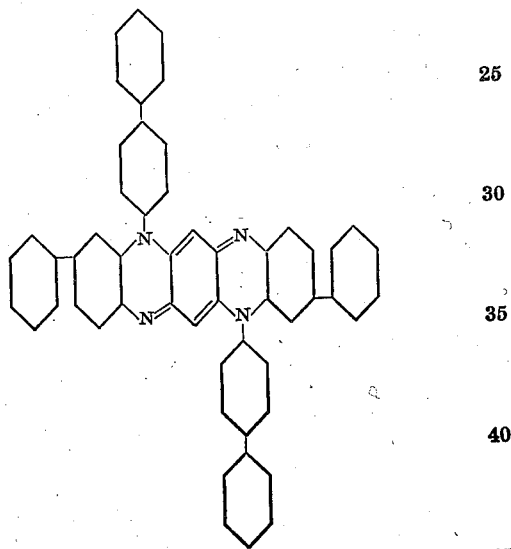

By causing fuming sulfuric acid containing 20% of sulfuric anhydride to act upon the product, the latter may easily be sulfonated.

100 parts of cotton are dyed for 1 hour with 3.5 parts of the dyestuff thus sulfonated with addition of 25% of sodium chloride and 0.2% of a wetting agent in a proportion of the liquor to the goods of 1:20 and at a temperature of 85° C. to 90° C. A blue coloration of a very clear tint is obtained.

(2) 1.5 parts of 3-aminopyrene (melting at 117° C.) are suspended in 20 parts of glacial acetic acid, and 3 parts of para-quinonedianil are introduced in the cold; the solution is then heated for 1 hour at 110° C. After cooling to about 70° C., 10 parts of alcohol are added and the reaction product obtained in filtered off. It is boiled with alcohol, the diphenyl-para-phenylenediamine formed during the reaction being thus extracted. The product forms small black crystals which dissolve in concentrated sulfuric acid to a violet solution. It has the following probable constitution:

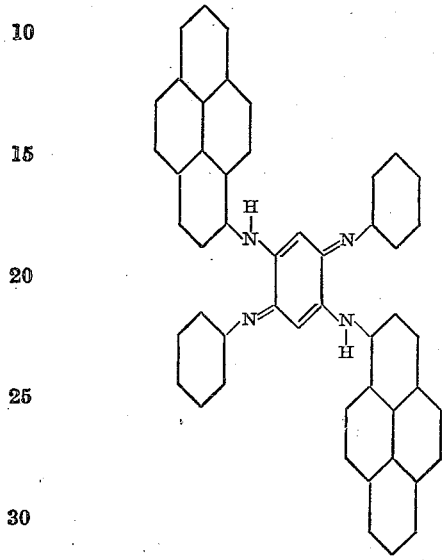

One part of the product thus obtained is dissolved in 15 parts of alpha-chlornaphthalene and the solution is mixed, while hot, with 0.9 part of lead dioxide and boiled for 30 minutes. When the solution has become blue, it is freed from the lead oxides by filtration; on cooling the fluorindine separates in the form of small crystals which dissolve in concentrated sulfuric acid to a green solution. The dyestuff has one of the two constitutions:

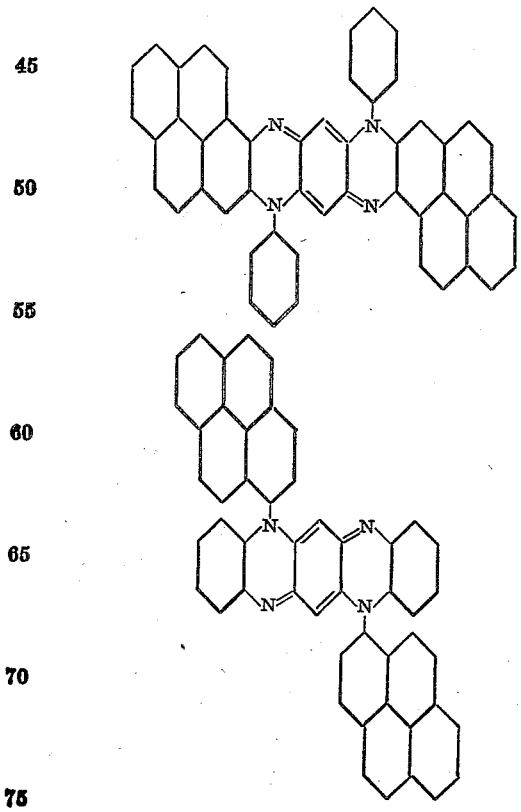

By dissolving the fluorindine in sulfuric acid monohydrate and adding such a quantity of fuming sulfuric acid containing 20% of sulfuric anhydride that the content of $SO_3$ of the solution amounts to 5%, sulfonation takes place easily.

100 parts of cotton yarn are dyed for 1 hour with 4 parts of the dyestuff thus sulfonated with addition of 15% of sodium chloride and 1.5% of sodium carbonate in a proportion of the liquor to the goods of 1:20 and at a temperature of 90° C. to 95° C. A green coloration is obtained which is very fast to light.

(3) 100 parts of viscose yarn are dyed for 1 hour with 3 parts of the dyestuff-sulfonic acid used in Example (2) with addition of 20% of calcined sodium sulfate and 2% of Marseille soap in a proportion of the liquor to the goods of 1:40 and at a temperature of 85° C. to 90° C. Green dyeings are obtained which have a very good fastness to light.

(4) 100 parts of mercerized cotton fabric are dyed for 1 hour with 5 parts of a dyestuff-sulfonic-acid which is obtainable according to Example (2), however under stronger sulfonation conditions, while adding 15% of sodium chloride and 1.5% of sodium carbonate in a proportion of the liquor to the goods of 1:30 at 85° C. to 90° C. Grey dyeings are obtained.

(5) Instead of the dyestuffs mentioned in Examples 1 to 4 there may also be used other dyestuffs which are obtainable according to the process of our co-pending application above referred to.

We claim:

1. The process which comprises dyeing, according to the methods known for substantive dyeings, cellulose material with an alkali salt of a sulfonic acid of a fluorindine compound.

2. The process which comprises dyeing, according to the methods known for substantive dyeings, cellulose material with an alkali salt of a sulfonic acid of a fluorindine compound which is obtainable by the process which comprises oxidizing to the fluorindine compound according to known methods an azophenin compound of the general formula:

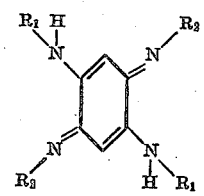

wherein $R_1$ represents an aromatic radical containing a negative substituent of the group consisting of nitro, CO-alkyl, CO-aryl and carboxyl, or containing more than one aromatic nucleus or a quinone nucleus and wherein $R_2$ represents an aromatic hydrocarbon radical, and sulfonating the product thus obtained.

3. The process which comprises dyeing, according to the methods known for substantive dyeings, cellulose material with an alkali salt of a sulfonic acid of a fluorindine compound which is obtainable by the process which comprises oxidizing to the fluorindine compound according to known methods an azophenin compound of the formula:

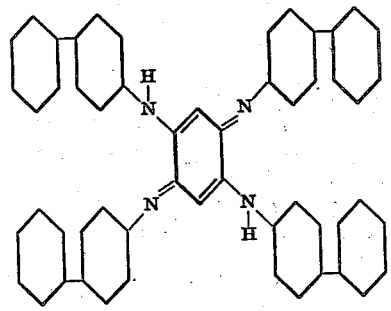

and sulfonating the product thus obtained.

4. The process which comprises dyeing, according to the methods known for substantive dyeings, cellulose material with an alkali salt of a sulfonic acid of a fluorindine compound which is obtainable by the process which comprises oxidizing to the fluorindine compound according to known methods an azophenin compound of the formula:

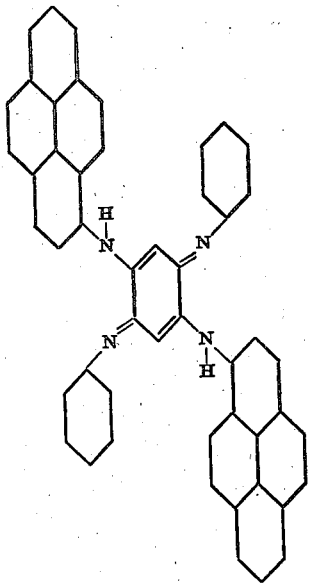

and sulfonating the product thus obtained.

ARTHUR WOLFRAM.
KURT BONSTEDT.